US007032897B2

(12) United States Patent
Hausler, III

(10) Patent No.: US 7,032,897 B2
(45) **Date of Patent: *Apr. 25, 2006**

(54) SWING CLAMP APPARATUS WITH SPRING BIASED CAM ASSEMBLY

(75) Inventor: Frederick A. Hausler, III, Emporia, KS (US)

(73) Assignee: Vektek, Inc., Emporia, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/964,289

(22) Filed: Oct. 13, 2004

(65) Prior Publication Data

US 2005/0206059 A1 Sep. 22, 2005

Related U.S. Application Data

(63) Continuation of application No. 10/802,229, filed on Mar. 17, 2004.

(51) Int. Cl.
*B23Q 3/08* (2006.01)

(52) U.S. Cl. .......................................... 269/32; 269/24

(58) Field of Classification Search .................. 269/24, 269/20, 27, 32
See application file for complete search history.

(56) References Cited

U.S. PATENT DOCUMENTS

| | | | | |
|---|---|---|---|---|
| 3,572,216 | A | | 3/1971 | Seesody |
| 3,605,569 | A | | 9/1971 | Seesody |
| 4,351,516 | A | * | 9/1982 | Ersoy et al. .................. 269/27 |
| 5,192,058 | A | | 3/1993 | VanDalsem et al. |
| 5,437,440 | A | * | 8/1995 | Keaton ........................ 269/24 |
| 5,695,177 | A | * | 12/1997 | Mascola ...................... 269/24 |
| 5,820,118 | A | | 10/1998 | Craft |
| 5,876,025 | A | | 3/1999 | Yonezawa |
| 6,663,093 | B1 | | 12/2003 | Yonezawa et al. |

* cited by examiner

*Primary Examiner*—Lee D. Wilson
(74) *Attorney, Agent, or Firm*—Hovey Williams LLP

(57) ABSTRACT

An improved shiftable clamp (12) adapted for connection to a fixture (10) is provided, wherein the clamp (12) is selectively operable to engage and hold a workpiece (14) to the fixture (10). The clamp (12) includes a tubular body (22) and a piston (24) telescopically received within the body (22). Movement of the piston (24) is guided and controlled by way of a cam assembly (26) including a cam track (64) formed in the piston (24) and an associated cam track follower ball (66) mounted on the body (22). A spring unit (74) is also provided on the body (22) and includes a spring (82, 96) serving to self-center and bias the ball (66) into the track (64). This insures that the ball (66) smoothly rotates during movement of piston (22) and reduces wear and premature clamp failure.

15 Claims, 2 Drawing Sheets

SWING CLAMP APPARATUS WITH SPRING BIASED CAM ASSEMBLY

RELATED APPLICATIONS

This application is a continuation of and claims priority benefit to U.S. patent application Ser. No. 10/802,229, filed Mar. 17, 2004 entitled SWING CLAMP APPARATUS WITH SPRING BIASED CAM ASSEMBLY, which is hereby incorporated into the present application by reference.

BACKGROUND OF THE INVENTION

1. Field of the Invention

The present invention is broadly concerned with improved clamps used for clamping workpieces to fixtures, and especially so-called swing clamps which simultaneously move in axial and rotational directions to allow easy placement and removal of workpieces. More particularly, the invention is concerned with such clamps including a shiftable piston equipped with a workpiece-engaging outer head, where piston movement is guided and controlled via an internal cam assembly made up of a specially configured cam track and cam follower ball arrangement. Such cam assemblies are provided with spring units serving to bias and self-center the follower balls into the associated tracks, providing many operational advantages including increased clamp speeds and reduction in clamp wear and damage.

2. Description of the Prior Art

Hydraulic clamps are commonly used in manufacturing operations to hold and clamp workpieces to stationary fixtures, so that the workpieces may be machined or otherwise worked upon. Typical hydraulic clamps include a cylinder body adapted for attachment to a fixture and a piston telescopically received within the cylinder body for movement between an retracted, clamping position and an extended, release position. A clamping head is attached to the distal end of the piston for holding and clamping workpieces to the fixture when the piston is in its retracted, clamping position. Commonly, several such clamps are mounted to a single fixture so that a workpiece may be securely held at several locations while it is being worked upon.

Swing clamps are hydraulic clamps that include swinging mechanisms serving to swing the clamping heads away from the workpiece when the pistons are extended to their release positions. Swing clamps make it easier to load and unload workpieces from fixtures, especially in confined spaces.

One type of swinging mechanism used in swing clamps is a cam assembly having a curved cam track or groove formed in either the piston or the cylinder body and a corresponding cam follower ball attached to the other of the piston and cylinder body. The follower ball moves along the curved cam track when the piston is shifted which serves to rotate the piston and clamping head as described.

Conventional cam assemblies in swing clamps are subject to premature wear over time that interferes with the swinging operation of the clamps. Specifically, when the cam follower ball moves in the track, it is subject to circumferential forces tending to push the ball to the sides of the groove. Over time, the cam ball wears down the edges of the track and creates dimples along the length thereof. The dimples and worn regions of the cam track often catch the ball during piston movement, creating a "choppy" clamp operation. When a clamp is used in severe conditions, its cam ball may completely wear down the edges of the track, causing the ball to completely roll out of the groove.

Excessive wear on the cam grooves of a clamp can be a serious problem. In many clamping operations, it is important for the clamping head to swing to a precise location away from the workpiece, and then return to the same exact starting position when the clamp is shifted to its clamping position. When the cam groove on a clamp become worn, the swing clamp can no longer achieve this precise and repeatable swinging movement. Thus, the entire swing clamp must be replaced, even though the remaining parts of the clamp are in good condition.

U.S. Pat. No. 5,820,118 describes a decided improvement in the swing clamp art. In this patent, uses may of a special cam track design which inhibits the cam follower ball from prematurely wearing the cam track edges. Specifically, the cam track described in the '118 patent includes a central arcuate region and a pair of substantially planar side faces extending tangentially from the central arcuate region. This construction forces the cam follower ball to be more centrally seated within the cam track without pushing up against the edges of the cam track.

SUMMARY OF THE INVENTION

The present invention is directed to further improvements in shiftable clamps, and particularly the swing clamps described above. Broadly speaking, the clamps of the invention include a hollow body for attachment to a fixture, with the body presenting an interior wall. A piston is telescopically received within the body for movement between clamping and released positions. A cam assembly is used for guiding and controlling relative movement between the piston and body, with the cam assembly having a cam track formed in one of the interior wall of the body and the outer wall of the piston, and a cam follower received within the cam track and attached to the other of the interior wall of the body and the outer wall of the piston. The specific improvement of the invention involves the use of a spring for biasing the ball toward the cam track. It has been discovered that use of such a spring affords a number of operational advantages, including improved clamping speeds and reduced wear.

In preferred forms, the biasing spring forms part of a spring unit having a follower-engaging component with a spring remote from the follower, thereby biasing the follower through the component. The spring may be of any desired construction, for example a bellville spring or a small coil spring. In the usual case, the cam follower is a ball and the spring unit is mounted within a recess on the clamp body; the component has an arcuate face in direct engagement with the ball, whereas the spring is within the recess.

DETAILED DESCRIPTION OF THE PREFERRED EMBODIMENT

Figure 1:
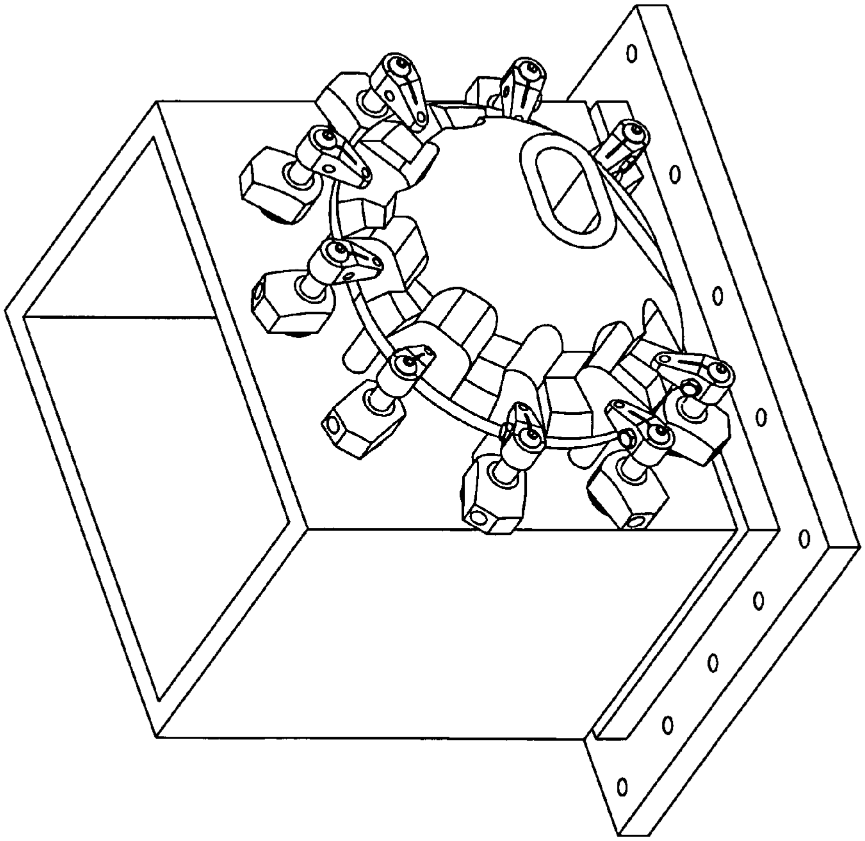
FIG. 1 is an isometric view of a fixture equipped with a plurality of clamps in accordance with the invention, shown with the clamps engaging and clamping a workpiece to the fixture.

Turning now to the drawings, FIG. 1 illustrates a fixture 10 equipped with a plurality of clamps 12 adapted to releasably hold a workpiece 14 in position on the fixture 10. As illustrated, the exemplary fixture 10 includes a base 16 supporting an upright mounting box 18, the latter having a workpiece-supporting wall 20. The clamps 12 are threadably secured within threaded bores provided in wall 20 as will be described. Briefly, in operation the clamps 20 are selectively movable between the clamping position depicted in FIG. 1 to thus hold workpiece 14 in place, and a retracted, swung-away position allowing removal of the workpiece 14 after it is worked upon, and positioning of another workpiece 14 in its place.

In more detail, the body 22 has an elongated segment 30 presenting an inner wall 32 as well as a threaded exterior wall 34. Each clamp 12 includes an elongated, tubular body 22 together with a piston 24 telescopically received within the body 22, and a cam assembly broadly referred to by the numeral 26 for guiding and controlling relative movement between piston 24 and body 22. As shown, each piston 24 supports an outer clamping head 28 adapted to engage workpiece 14 which mates with the clamp bores in wall 20. A recess 33 is formed in segment 30 and extends outwardly from wall 32 as shown. The base of segment 30 is internally threaded at 36 and receives a correspondingly threaded cup-shaped plug 38. The body 22 also has a somewhat enlarged outer portion 40 remote from plug 38 which has an inner wall 42 concentric with wall 32, thus defining an annular stop shoulder 44. The portion 40 has an inner sealing ring 46 and retainer 48. Finally, the portion 40 includes a hydraulic fluid port 50 which-communicates with passageway 52.

Figure 2:
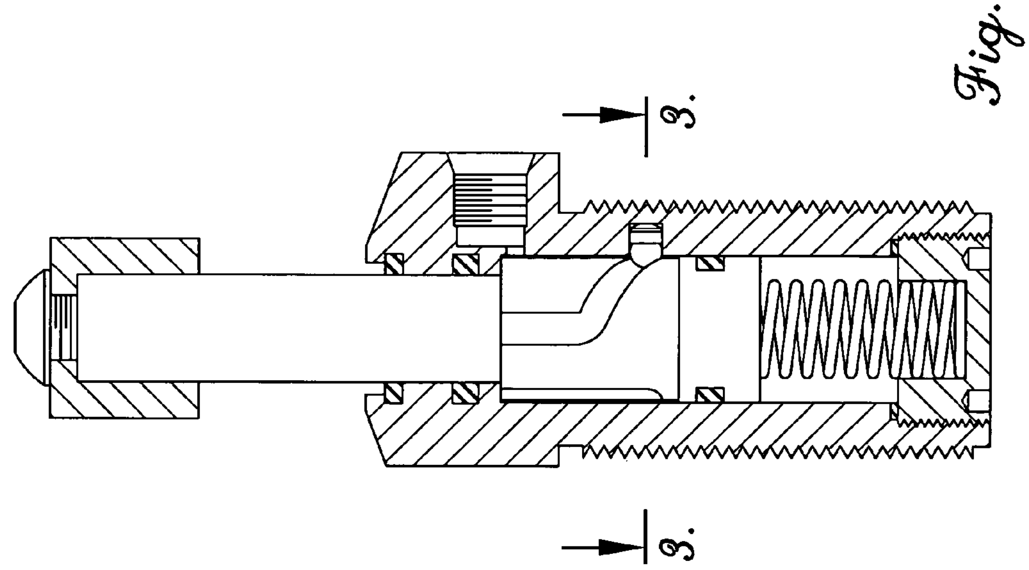
FIG. 2 is a vertical sectional view of a preferred clamp of the invention.

Piston 24 includes a base 54 equipped with a sealing ring 56 engaging surface 32, a guide section 58 presenting an outer surface 59 and extending upwardly from base 54, and a rod 60 extending beyond portion 40. A relatively large translation spring 62 is seated within plug 38 and engages the underside of base 54 as shown. As illustrated in FIG. 2, the section 58 has a slightly reduced diameter as compared with base 54 but has a greater diameter than rod 60.

The assembly 26 includes a plurality (here three, two of which are shown) of circumferentially spaced apart cam tracks 64*a*, 64*b* . . . formed in the outer surface 59 of piston section 58. The preferred tracks 64 are configured for guiding the piston along different paths during piston movement. For example, the track 64*a* is configured so as to cause piston 24 (and thereby head 28) to swing during retraction and extension of the piston, whereas track 64*b* is essentially rectilinear so that the piston 22 merely reciprocates without any swinging movement. In addition, the assembly 26 includes a cam follower ball 66 which is secured to body segment 30 adjacent inner surface 32; the ball 66 is seated within one of the tracks 64 as will be readily apparent from a consideration of FIGS. 2 and 3.

One possible geometry of the cam tracks 64 and the follower ball 66 is described in detail in the referenced U.S. Pat. No. 5,820,118, incorporated herein by reference. Briefly however, the cam follower has an outer peripheral surface presenting a radius of curvature R, whereas the cam track includes a central arcuate region 68 having a radius of curvature R' substantially equal to the radius R. Moreover, the track 64 has a pair of opposed, substantially planar side face 70, 72 extending from arcuate region 68, with the side faces 70, 72 each having a proximal end converging into the region 68 and an opposed distal end that diverges from the region 68, with the distal ends also diverging from one another. In other embodiments, the cam track has a geometry which matches that of the cam follower. Specifically, the cam track has essentially the same radius of curvature as the corresponding cam follower.

Figure 3:
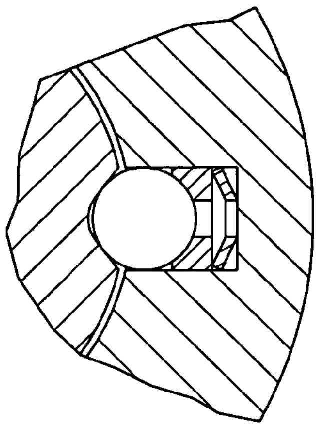
FIG. 3 is a fragmentary sectional view taken along line 3—3 of FIG. 2 and illustrating the construction of a bellville spring assembly used for biasing the cam follower ball into the cam groove of the piston.

The preferred assembly 26 also has a spring unit 74 seated within the recess 33 which biases the ball 68 toward and into the adjacent track 64. Referring to FIG. 3, the unit 74 includes a force-transmitting annular component 76 having an arcuate face 78 engaging ball 66, and an opposite, substantially planar face 80. In the depicted embodiment, a bellville spring 82 is disposed between the inner surface of recess 33 and face 80, and thereby biases ball 68.

Figure 4:
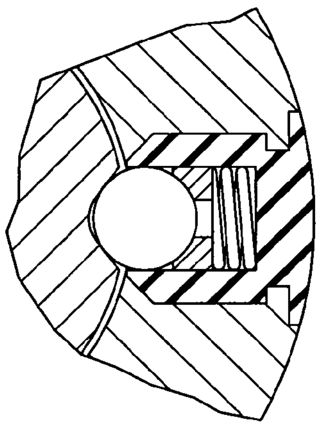
FIG. 4 is a sectional view similar to that of FIG. 3, but depicting the use of a coil spring assembly.

FIG. 4 illustrates a somewhat modified embodiment wherein a resilient elastomeric plug 84 is used to house a spring unit 86. In this case a through-bore 88 is provided in the segment 30 and is configured to receive plug 84. The latter includes an annular wall 90 defining a recess 92. The unit 86 is similar to unit 74 in that it includes a component 94 identical with component 76. However, in this case a coil spring 96 is seated within recess 92 and engages the planar face of component 94.

Figure 5:
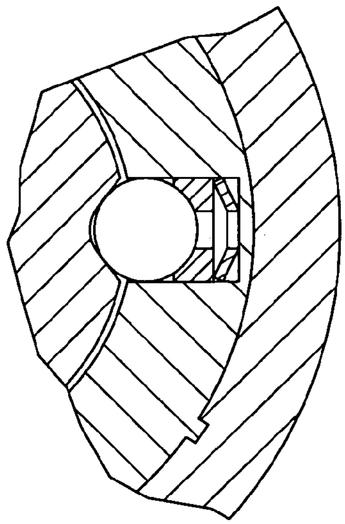
FIG. 5 is a sectional view similar to that of FIG. 3, but illustrating the use of a removable sleeve forming a part of the overall clamp body.

FIG. 5 illustrates a still further embodiment of the invention wherein the body 22*a* is formed using an outer tubular wall 98 together with an inner, replaceable sleeve 100 the latter being equipped with a recess 33*a*. The recess 33*a* houses the identical spring unit 74 described with reference to FIG. 3. Use of a replaceable sleeve 100 permits ready repair of a clamp 12 in the field.

Each clamp 28 is in the form of an elongated element 101 presenting a workpiece-engaging underside 102. A screw 104 is employed to attach each element 101 to the outer end of each rod 60.

After the clamps 12 are installed on wall 20 of fixture 10 by threading the segments 30 thereof into the pre-drilled holes in wall 20, the clamps may be used for holding workpieces 14 in place. Turning to FIG. 2, it will be seen that the spring 62 of each clamp 12 serves to bias the corresponding piston 22 to its extended position where, in the illustrated embodiment, the head 28 is swung laterally to a clearing position allowing removal and replacement of a workpiece 14 onto the fixture. When this is done, the individual clamps are actuated by application of hydraulic fluid through the ports 50, whereupon the pressurized fluid passes downwardly between the walls 32, 59 and engages base 54, thereby moving the piston downwardly against the bias of spring 62. During such movement of the pistons, the heads 28 are swung laterally owing to the configuration of cam tracks 64*a* and follower balls 66 until the heads come into proper holding relationship with the workpiece 14. After operations on workpiece 14 are completed, the pressurized hydraulic fluid is relieved, thereby permitting the springs 62 to return the individual pistons 22 and clamps 28 to their extended and swung-away positions.

The provision of spring units in accordance with the invention provides a number of significant operational advantages. First, the spring units insure that the biased cam follower balls 66 self-center in the associated tracks 64*a*. Thus, the balls 66 are constrained in both vertical and horizontal planes, providing a stationary point for the cam tracks 64*a* for proper guidance through both axial and rotary motion. In essence, the components 76 act as bearing races allowing the balls 66 to rotate as the pistons move through their strokes, while at the same time biasing the balls 66 so that they remain fully engaged in the tracks 64*a*.

This construction reduces the static and dynamic frictional forces generated between the balls 66 and the track 64*a*, especially during starting movement of the pistons, allowing smoother tracking and essentially eliminating the tendency of the balls to drag within the tracks, rather than to rotate. The spring units give an even load distribution and, owing to the self-centering action of the spring units, the balls 66 are inhibited from riding up on the edge of the tracks. At the same time, the design allows a degree of ball float within the tracks to compensate for manufacturing and operational variations. It has been found that cam damage during inadvertent arm contact, a frequent problem in the art, is reduced with the present invention. Consequently, higher clamp speeds are possible as compared with current designs, while at the same time eliminating the wear and operational problems commonly encountered with conventional clamps.

Although not shown in detail, it will be appreciated that the clamps of the invention may assume a variety of different configurations. For example, while in the illustrated embodiment the hydraulic clamp is single acting, making use of the translation spring 62, the invention is not so limited. Thus, it is well within the skill of the art to employ a double acting hydraulic design wherein pressurized hydraulic fluid is used to move the piston 22 in both directions. Additionally, while a rotatable cam follower ball is preferred, other follower designs could be employed.

The invention claimed is:

1. In a clamp for clamping a workpiece to a fixture, said clamp having an elongated, hollow body for attachment to the fixture and presenting an interior wall, a piston presenting an outer wall and telescopically received within said body for movement between a clamping position for clamping said workpiece to the fixture and a release position, and a cam assembly for guiding relative movement between said piston and said body, the cam assembly including a cam track formed in one of said interior wall of the body and said outer wall of the piston, and a cam follower received within said cam track and attached to the other of said interior wall of the body and said outer wall of the piston, the improvement comprising a spring biasing said cam follower toward said cam track.

2. The clamp of claim 1, said follower comprising a ball.

3. The clamp of claim 1, said cam track comprising a groove formed in said piston outer wall.

4. The clamp of claim 1, the cam assembly including a plurality of differently configured, spaced apart cam tracks formed in said piston outer wall, said cam follower being positionable in any one of the cam tracks for guiding said relative movement in respective directions corresponding to the configuration of the one cam track.

5. The clamp of claim 1, further including a clamping head operably coupled with said piston for engaging and clamping the workpiece to the fixture when the piston is in said clamping position thereof.

6. The clamp of claim 1, said cam follower having an outer peripheral surface presenting a radius of curvature, the cam track including a central arcuate region having a radius of curvature substantially equal to the radius of curvature of said cam follower, and a pair of opposed, substantially planar side faces extending from the central arcuate region, said side faces each having a proximal end that converges into said central arcuate region and an opposite distal end that diverges from the central arcuate region, the distal ends diverging away from one another.

7. The clamp of claim 1, said body including an outer wall and an inner sleeve operably coupled with the outer wall, said sleeve presenting said body inner wall.

8. The clamp of claim 1, said spring comprising a coil spring.

9. The clamp of claim 1, said spring comprising a bellville spring.

10. The clamp of claim 1, including an resilient elastomeric plug operatively maintaining the position of said spring.

11. The clamp of claim 1, including hydraulic fluid passageways formed in said body permitting application of pressurized hydraulic fluid within said body in order to effect movement of said piston relative to said body.

12. The clamp of claim 11, said piston being a single acting piston, there being a translation spring operably coupled with said piston.

13. A clamp for clamping a workpiece to a fixture, the clamp comprising:

- an elongated hollow body presenting an interior wall;
- a piston telescopically received in the body for movement between a clamping position and a release position, the piston presenting an outer wall; and
- a cam assembly for guiding relative movement between the piston and the body, the cam assembly including:
  - a cam track formed in one of the interior walls of the body and the outer wall of the piston,
  - a cam follower attached to the other of the interior wall of the body and the outer wall of the piston, and
  - a biasing element for biasing the cam follower toward the cam track.

14. The clamp as set forth in claim 13, the biasing element comprising a spring.

15. The clamp as set forth in claim 14, further including a force-transmitting component engaging the cam follower, the spring engaging the force-transmitting component.

* * * * *